United States Patent
Bafna et al.

(10) Patent No.: US 11,253,963 B1
(45) Date of Patent: Feb. 22, 2022

(54) SEPARABLE COMPONENT ASSEMBLY HAVING REDUCED SEAL STICTION

(71) Applicant: Raytheon Company, Waltham, MA (US)

(72) Inventors: Sudhir Bafna, Tucson, AZ (US); David R. Smith, Green Valley, AZ (US); Kohl Leger, Sahuarita, AZ (US); Read L. Bryant, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/995,737

(22) Filed: Aug. 17, 2020

(51) Int. Cl.
*B23P 19/04* (2006.01)
*F16J 15/06* (2006.01)
*F02K 9/34* (2006.01)

(52) U.S. Cl.
CPC ............ *B23P 19/04* (2013.01); *F16J 15/062* (2013.01); *F02K 9/343* (2013.01)

(58) Field of Classification Search
CPC ........ F16J 15/062; F16J 15/024; F16J 15/027; F02K 9/74; F02K 9/76; F02K 9/763; F02K 9/766; F02K 9/343
USPC .................................................. 277/551, 609
See application file for complete search history.

(56) References Cited

U.S. PATENT DOCUMENTS

| | | | | |
|---|---|---|---|---|
| 1,437,646 | A | * | 12/1922 | Girard ...................... F16J 15/34 277/398 |
| 2,795,444 | A | * | 6/1957 | Nenzell ................... F16B 43/00 411/542 |
| 3,270,502 | A | * | 9/1966 | Silver ....................... F02K 9/24 60/255 |
| 3,781,043 | A | | 12/1973 | Hagmann |
| 4,223,897 | A | | 9/1980 | Staab et al. |
| 4,867,460 | A | | 9/1989 | Colo et al. |

(Continued)

FOREIGN PATENT DOCUMENTS

JP 5498790 B2 5/2014

OTHER PUBLICATIONS

Voyer et al., Reduction of the Adhesive Friction of Elastomers through Laser Texturing of Injection Molds, Lubricants, Nov. 16, 2017, 18 pages, Switzerland.

(Continued)

*Primary Examiner* — Jason L Vaughan

(57) ABSTRACT

A separable component assembly is disclosed. The separable component assembly can include a first component having a first interface portion. The separable component assembly can also include a second component coupled to the first component. The second component can have a second interface portion. In addition, the separable component assembly can include a seal disposed between the first and second interface portions. The seal can have a first interface surface associated with the first interface portion. The seal can also have a second interface surface in contact with the second interface portion. Additionally, the seal can have a peel initiator defining a discontinuity in a portion of the second interface surface. Upon separation of the first and second components from one another, the discontinuity can create a stress concentration in the second interface surface that initiates peeling of the second interface surface away from the second interface portion.

15 Claims, 4 Drawing Sheets

(56) References Cited

U.S. PATENT DOCUMENTS

| | | | |
|---|---|---|---|
| 4,950,002 A * | 8/1990 | Hormansdorfer | F16J 15/062 |
| | | | 277/625 |
| 5,509,670 A * | 4/1996 | Wheeler | F16J 15/3236 |
| | | | 277/565 |
| 5,868,397 A * | 2/1999 | Kuboshima | F16J 15/061 |
| | | | 277/637 |
| 6,296,907 B1 | 10/2001 | Viksne | |
| 6,859,577 B2 | 2/2005 | Lin | |
| 7,074,637 B2 | 7/2006 | Lutz et al. | |
| 7,468,830 B2 | 12/2008 | Pan | |
| 7,628,072 B2 | 12/2009 | Koury, Jr. et al. | |
| 7,758,912 B2 | 7/2010 | Reboa | |
| 7,797,082 B2 | 9/2010 | Srinivasan et al. | |
| 8,120,155 B2 | 2/2012 | Atnip et al. | |
| 8,434,793 B2 | 5/2013 | Glime | |
| D687,932 S | 8/2013 | Henry | |
| 8,613,287 B2 | 12/2013 | Je et al. | |
| 8,739,690 B2 * | 6/2014 | Chameroy | F16J 15/025 |
| | | | 99/337 |
| 8,777,112 B2 * | 7/2014 | Mieslinger | F16J 15/064 |
| | | | 235/492 |
| 8,814,174 B2 | 8/2014 | Okuda et al. | |
| 8,895,339 B2 | 11/2014 | Montez et al. | |
| 8,940,586 B2 | 1/2015 | Kuo et al. | |
| 8,948,706 B2 | 2/2015 | Napoles et al. | |
| D731,036 S | 6/2015 | Lee | |
| 9,169,929 B2 | 10/2015 | Kellar et al. | |
| 9,201,236 B2 | 12/2015 | Wu et al. | |
| 9,228,658 B2 | 1/2016 | Epshetsky et al. | |
| 9,290,380 B2 | 3/2016 | Steimle et al. | |
| 9,550,664 B2 | 1/2017 | Montez et al. | |
| 9,776,853 B2 | 10/2017 | Steimle et al. | |
| 9,926,192 B2 | 3/2018 | Zhang et al. | |
| 10,208,862 B2 | 2/2019 | Fitzmorris et al. | |
| 10,302,200 B2 | 5/2019 | Dietle | |
| 2003/0062718 A1 | 4/2003 | Radzik | |
| 2003/0146464 A1 | 8/2003 | Prophet | |
| 2005/0109889 A1 | 5/2005 | Heldmann | |
| 2005/0116427 A1 | 6/2005 | Seidel et al. | |
| 2006/0077503 A1 | 4/2006 | Palmateer et al. | |
| 2006/0237463 A1 * | 10/2006 | Riviezzo | F16J 15/106 |
| | | | 220/562 |
| 2008/0000289 A1 | 1/2008 | Furuse | |
| 2010/0181652 A1 | 7/2010 | Milne et al. | |
| 2013/0001895 A1 | 1/2013 | Son et al. | |
| 2013/0200576 A1 | 8/2013 | Crawford et al. | |
| 2014/0264655 A1 | 9/2014 | Williams et al. | |
| 2017/0003499 A1 | 1/2017 | Ma et al. | |
| 2017/0363234 A1 | 12/2017 | Britt, Jr. | |

OTHER PUBLICATIONS

International Search Report for International Application No. PCT/US2021/037940 dated Nov. 18, 2021, 10 pages.

* cited by examiner

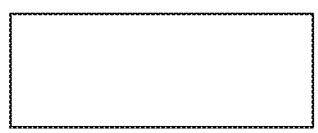
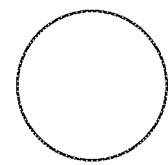
*FIG. 4A*  *FIG. 4B*
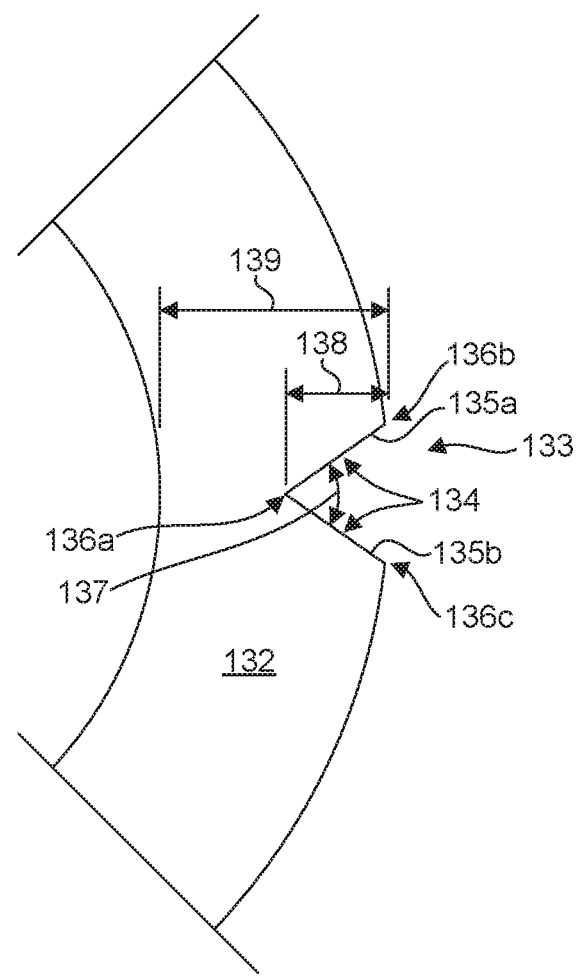
*FIG. 5*

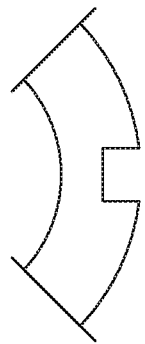
FIG. 6A                    FIG. 6B
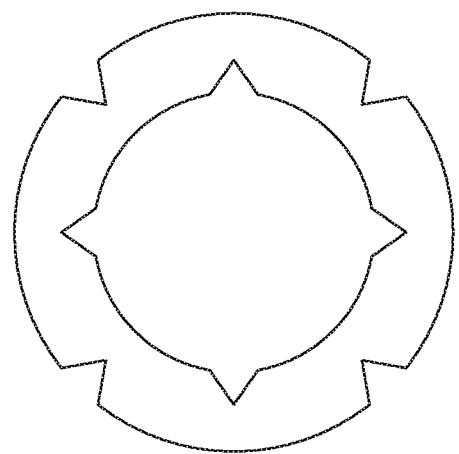
FIG. 7

SEPARABLE COMPONENT ASSEMBLY HAVING REDUCED SEAL STICTION

GOVERNMENT LICENSE RIGHTS

This invention was made with government support under government contract HQ0727-18-F-1613 awarded by the United States Department of Defense. The government has certain rights in the invention.

BACKGROUND

Elastomer seals, gaskets, O-rings, etc. are utilized in component couplings found in various types of hardware, typically under compressive stress. Such component couplings may remain static or motionless for long periods of time (e.g., years or decades) prior to separation. One such example is a first rocket stage mated and sealed to a second rocket stage, where the first stage is intended to separate from the second stage during use.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein;

FIGS. 4A and 4B illustrate seal cross-sectional shapes in accordance with examples of the present disclosure.

FIG. 5 is an illustration of a peel initiator in accordance with an example of the present disclosure.

FIGS. 6A and 6B illustrate peel initiator shapes in accordance with examples of the present disclosure, FIG. 7 is an illustration of a seal n accordance with an example of the present disclosure.

Figure 1:
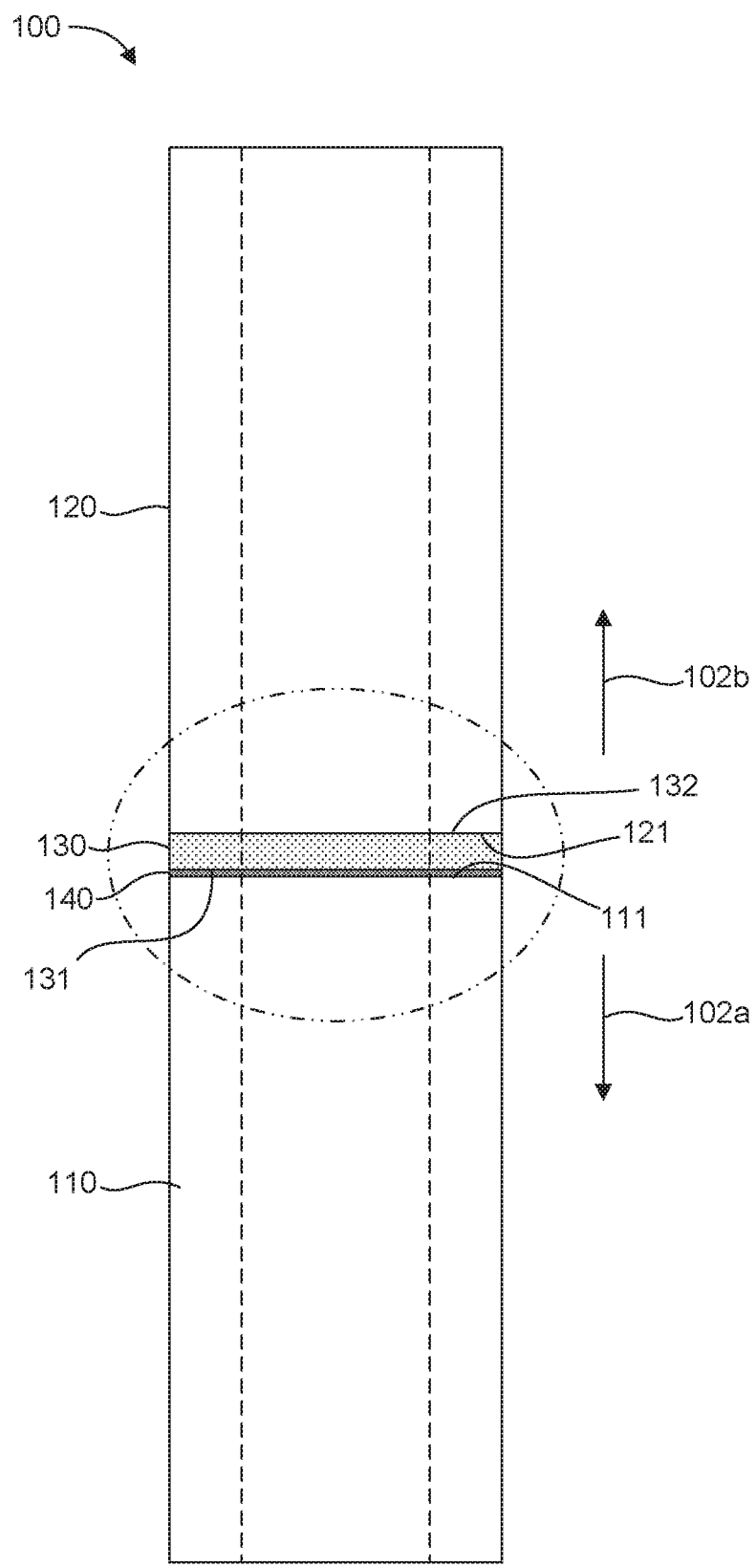
FIG. 1 is an illustration of a separable component assembly in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

As noted above, some existing component couplings (e.g., first and second rocket stages) may remain static or motionless for long periods of time (e.g., years or decades). Compressive stress over time can cause existing seals, gaskets, or O-rings to form a "bond" with one or more of the coupled components. When separation of the coupling is required, often rapidly or instantaneously, the "bond" or stiction resists or retards this separation of coupled components, which can be problematic in meeting requirements such as the coupled components separating within a specified time period or with a specified minimum separation speed.

Accordingly, a separable component assembly is disclosed that reduces the force required to overcome such bonding or stiction between a seal and mating component. The separable component assembly can include a first component having a first interface portion. The separable component assembly can also include a second component coupled to the first component. The second component can have a second interface portion. In addition, the separable component assembly can include a seal disposed between the first and second interface portions. The seal can have a first interface surface associated with the first interface portion. The seal can also have a second interface surface in contact with the second interface portion. Additionally, the seal can have at least one peel initiator defining one or more discontinuities in a portion of the second interface surfaces so as to facilitate the reduction in the amount of stiction or the stiction phenomenon between the first and second components. Upon separation of the first and second components from one another, the discontinuity can create a stress concentration in the second interface surface that initiates peeling of the second interface surface away from the second interface portion. Advantageously, the seal with the peel initiators defining one or more discontinuities can facilitate the first and second coupled components separating within a specified time period or with a specified minimum separation speed.

Figure 2:
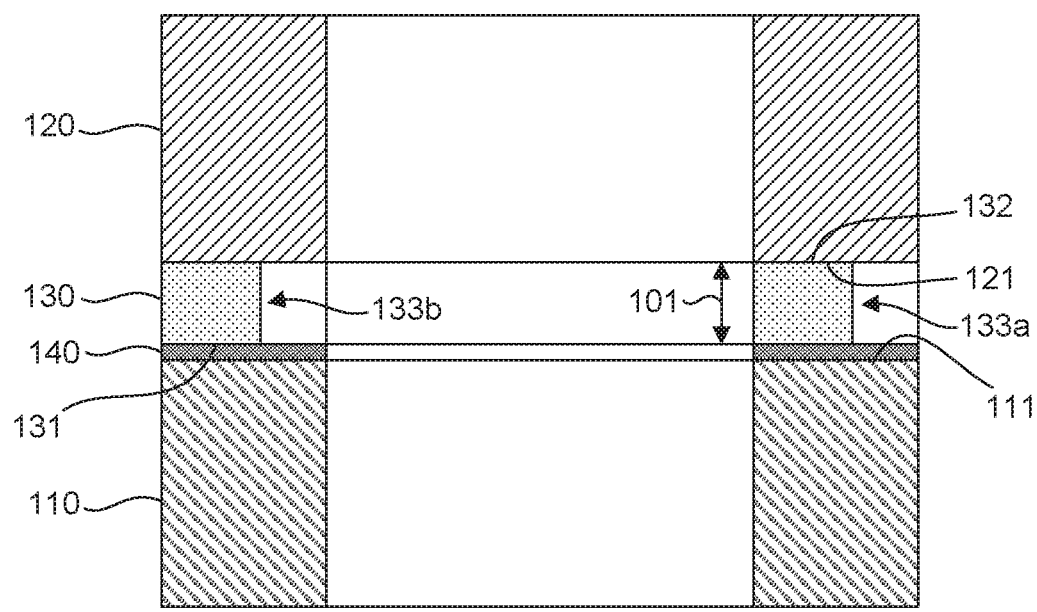
FIG. 2 is a detailed cross-sectional view of the separable component assembly of FIG. 1, in accordance with an example of the present disclosure.

To further describe the present technology, examples are now provided with reference to the figures. With reference to FIG. 1, one example of a separable component assembly 100 is illustrated. A detailed cross-sectional view of the separable component assembly 100 is shown in FIG. 2. The separable component assembly 100 can include a first component 110. The separable component assembly 100 can also include a second component 120 coupled to the first component 110. The first and second components 110, 120 may be hollow and cylindrical but are not limited to this configuration. In one specific example, the first component 110 can be a first rocket stage and the second component 120 can be a second rocket stage. However, this is not intended to be limiting in any way, as the first and second components can comprise other structural members designed and configured to be joined or otherwise coupled together.

The first component 110 can have a first interface portion 111, and the second component 120 can have a second interface portion 121. The separable component assembly 100 can include a seal 130 disposed between the first and second interface portions 111, 121. In one aspect, as shown in the figures, the seal 130 can have similar geometry and profile as the first and second components 110, 120, however the seal 130 can have any suitable geometry or configuration for a given application. In some examples, the seal 130 can be a gasket, an O-ring, or any other suitable type or configuration of a seal between the first and second components 110, 120. The seal 130 can be constructed of any suitable material, such as an elastomeric material. The seal 130 can have a first interface surface 131 associated with the first interface portion 111 of the first component 110. The seal 130 can also have a second interface surface 132 in contact with the second interface portion 121 of the second component 120. In some examples, the seal 130 may be bonded (e.g., with an adhesive 140) to the first component 110 to prevent the seal 130 from dislocating when the first and second components 110, 120 separate.

Figure 3:
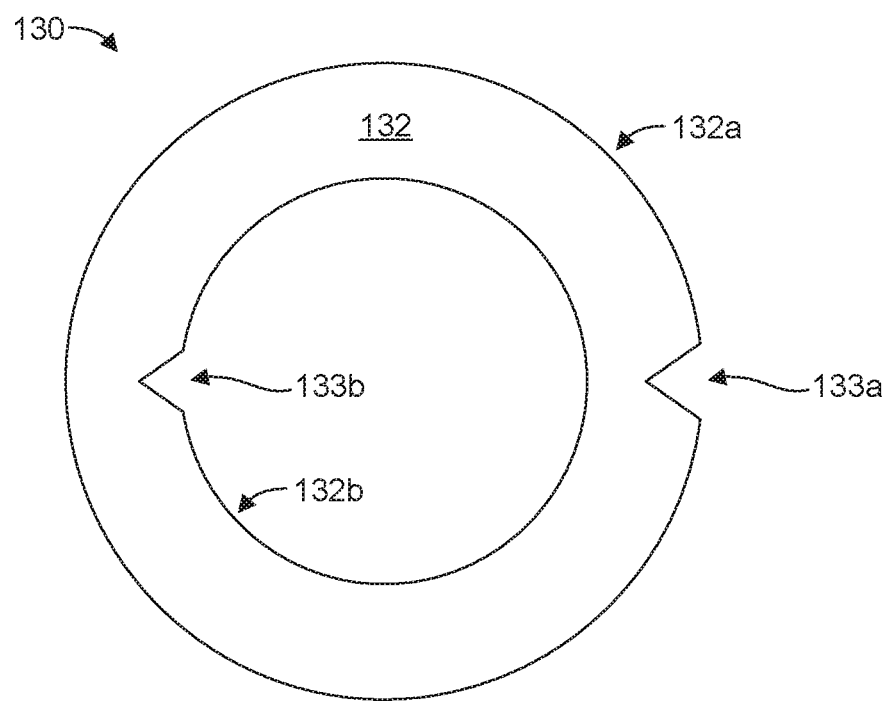
FIG. 3 is an illustration of a seal in accordance with an example of the present disclosure.

In addition, the seal 130 can have one or more peel initiators 133a, 133b, as shown in the cross-sectional view of FIG. 2 and the top view of the seal 130 in FIG. 3. In one aspect, one or both of the peel initiators 133a, 133b can extend through a thickness 101 (FIG. 2) of the seal 130 (i.e., the seal thickness configured to be oriented axially between the first and second components 110, 120). The seal 130 can have any suitable cross-section, such as a polygon shape (e.g.; a rectangle, a trapezoid, a triangle, pentagon, a hexagon, an octagon, etc.), a curved shape (e.g., a circle, an oval, an ellipse, etc.), a curvilinear shape, etc. Thus, a thickness of the seal can comprise a thickness of any suitable cross-sectional shape. In one aspect, a thickness of the seal comprises at least one of a rectangular cross-section (FIG. 4A) or a circular cross-section (FIG. 4B).

As illustrated in a representative peel initiator 133 shown in FIG. 5, the peel initiator 133 can define a discontinuity 134 in a portion of the second interface surface 132. The discontinuity 134 can be a recess, a cut, a notch, etc. formed in the profile of the second interface surface 132 that creates a discontinuous surface or profile. In other words, the discontinuity 134 can break or interrupt an otherwise uniform surface 132, and therefore disrupt the static friction present between the uniform surface 132 and either of the first and second components 110, 120. Upon separation of the first and second components 110, 120 from one another in directions 102a, 102b (FIG. 1), the discontinuity 134 can create a stress concentration (e.g., at singularities or "corners" 136a-c of the discontinuity 134) in the second interface surface 132 that initiates peeling of the second interface surface 132 away from the second interface portion 121.

The peel initiator 133 can include any shape or geometry that can introduce a stress concentration. In one example, the discontinuity 134 can comprise a profile defined at least partially by two lines 135a, 135b intersecting at a point 136a that creates the stress concentration. The two lines 135a, 135b can be at any suitable angle 137 relative to one another. In one aspect, the angle 137 can be greater than or equal to about 5 degrees and less than or equal to about 150 degrees. In another aspect, a depth 138 of the discontinuity 134 can be greater than or equal to about 3% of a width 139 of the second interface surface 132 and less than or equal to about 90% of the width 139 of the second interface surface 132. A discontinuity can be of any suitable shape, geometry, or configuration. In one aspect, the discontinuity 134 can comprise at least one of a V-shape (FIG. 3), a U-shape (FIG. 6A), or a W-shape (e.g., a sawtooth profile) (FIG. 6B) (i.e., any one of these or any combination of these).

As shown in FIGS. 3 and 7, a seal can include any suitable number of peel initiators as described herein. In the context of the FIG. 3 example (but also applicable to the FIG. 7 example), the peel initiator 133a is located on one side 132a of the second interface surface 132 and the peel initiator 133b is located on another side 132b of the second interface surface 132 opposite the first side 132a. In other words, the peel initiators 133a, 133b can be formed along an edge of the seal 130. In one aspect, the seal 130 can comprise a ring configuration, and the side 132a is proximate an inner diameter of the ring configuration and the side 132b is proximate an outer diameter of the ring configuration. Thus, peel initiators can be configured and arranged about a seal to achieve a desired stiction reducing or releasing effect from an interfacing component.

In a specific example, a seal can be disposed between two adjacent components (e.g., first and second stages) of a rocket or missile that are intended to separate from one another. In this configuration, the seal is under compressive stress in the direction of the central axis of the rocket. During flight, the two adjacent components (e.g., first and second stages) are designed to separate. The seal may be bonded (e.g., with an adhesive) to one of the two components to prevent it from dislocating when the two adjacent rocket components separate. Typically, the separation must be accomplished very quickly to ensure proper operation and flight of the rocket. Separation of the seal from the mating rocket component that is it not bonded to the seal may be retarded or prevented due to stiction of the seal to this rocket component. The magnitude of stiction may be reduced by one or more discontinuities as described herein. These discontinuities function to initiate peeling of the seal from the interfacing component and can therefore reduce the force necessary to separate the seal from the interfacing rocket component. Thus, the discontinuities can reduce the amount of force required to separate the first and second stages, which can ensure proper separation and operation of the rocket.

In accordance with one embodiment of the present invention, a method is disclosed for facilitating separation of two components from one another. The method can comprise obtaining a first component having a first interface portion. The method can also comprise obtaining a second component coupleable to the first component, the second component having a second interface portion. The method can further comprise disposing a seal between the first and second interface portions, the seal having a first interface surface associated with the first interface portion, and a second interface surface in contact with the second interface portion. Additionally, the method can comprise facilitating separation of the second interface surface from the second interface portion upon separation of the first and second components from one another, wherein a discontinuity in a portion of the second interface surface creates a stress concentration in the second interface surface that initiates peeling of the second interface surface away from the second interface portion. It is noted that no specific order is required in this method, though generally in one embodiment, these method steps can be carried out sequentially.

In one aspect of the method, the discontinuity comprises a profile defined at least partially by two lines intersecting at a point that creates the stress concentration. In a specific aspect of the method, an angle between the two lines is greater than or equal to about 5 degrees and less than or equal to about 150 degrees. In one aspect of the method, the discontinuity comprises at least one of a V-shape, a U-shape, or a W-shape.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A separable component assembly comprising:
   a first component having a first interface portion,
   a second component coupled to the first component, the second component having a second interface portion; and
   a seal having a thickness disposed between the first and second interface portions, the seal having a first interface surface associated with the first interface portion, a second interface surface in contact with the second interface portion, and a peel initiator defining a discontinuity in a portion of the second interface surface, that extends through the thickness of the seal,
   wherein, upon separation of the first and second components from one another, the discontinuity creates a stress concentration in the second interface surface that initiates peeling of the second interface surface away from the second interface portion.

2. The separable component assembly of claim 1, wherein the discontinuity comprises a profile defined at least partially by two lines intersecting at a point that creates the stress concentration.

3. The separable component assembly of claim 2, wherein an angle between the two lines is greater than or equal to about 5 degrees and less than or equal to about 150 degrees.

4. The separable component assembly of claim 1, wherein a depth of the discontinuity is greater than or equal to about 3% of a width of the second interface surface and less than or equal to about 90% of the width of the second interface surface.

5. The separable component assembly of claim 1, wherein the discontinuity comprises at least one of a V-shape, a U-shape, or a W-shape.

6. The separable component assembly of claim 1, wherein the peel initiator extends through a thickness of the seal.

7. The separable component assembly of claim 1, wherein a thickness of the seal comprises at least one of a rectangular cross-section or a circular cross-section.

8. The separable component assembly of claim 1, wherein the peel initiator is one of a plurality of peel initiators, each defining a discontinuity in a portion of the second interface surface, and each discontinuity operable to create a stress concentration.

9. The separable component assembly of claim 8, wherein a first of the plurality of peel initiators is located on a first side of the second interface surface and a second of the plurality of peel initiators is located on a second side of the second interface surface opposite the first side.

10. The separable component assembly of claim 9, wherein the seal comprises a ring configuration, and the first side is proximate an inner diameter of the ring configuration and the second side is proximate an outer diameter of the ring configuration.

11. The separable component assembly of claim 1, wherein the peel initiator is formed along an edge of the seal.

12. A method for facilitating separation of two components from one another, the method comprising:
    obtaining a first component having a first interface portion:
    obtaining a second component coupleable to the first component, the second component having a second interface portion:
    disposing a seal having a thickness between the first and second interface portions, the seal having a first interface surface associated with the first interface portion, and a second interface surface in contact with the second interface portion; and
    facilitating separation of the second interface surface from the second interface portion upon separation of the first and second components from one another, wherein a discontinuity that extends through the thickness of the seal is located in a portion of the second interface surface creates a stress concentration in the second interface surface that initiates peeling of the second interface surface away from the second interface portion.

13. The method of claim 12, wherein the discontinuity comprises a profile defined at least partially by two lines intersecting at a point that creates the stress concentration.

14. The method of claim 13, wherein an angle between the two lines is greater than or equal to about 5 degrees and less than or equal to about 150 degrees.

15. The method of claim 12, wherein the discontinuity comprises at least one of a V-shape, a U-shape, or a W-shape.

* * * * *